(12) United States Patent
Langlois et al.

(10) Patent No.: US 8,786,442 B2
(45) Date of Patent: Jul. 22, 2014

(54) SYSTEMS AND METHODS FOR INDICATING A QUALITY OF GROUPED ITEMS

(75) Inventors: Timothy A. Langlois, Fair Haven, VT (US); John Cronin, Jericho, VT (US); John A. Kintzer, Waterbury, VT (US)

(73) Assignee: Re Community Holdings II, Inc., Charlotte, NC (US)

( * ) Notice: Subject to any disclaimer, the term of this patent is extended or adjusted under 35 U.S.C. 154(b) by 0 days.

(21) Appl. No.: 13/249,871

(22) Filed: Sep. 30, 2011

(65) Prior Publication Data

US 2012/0019384 A1    Jan. 26, 2012

Related U.S. Application Data

(63) Continuation of application No. 12/483,144, filed on Jun. 11, 2009, now Pat. No. 8,068,029, which is a continuation of application No. 11/515,789, filed on Sep. 6, 2006, now Pat. No. 7,561,045.

(51) Int. Cl.
*G08B 13/14* (2006.01)

(52) U.S. Cl.
USPC .................................. 340/572.4; 340/572.1

(58) Field of Classification Search
USPC .......... 340/572.1, 572.4, 573.1, 573.5, 573.7, 340/571, 568.1, 568.5, 505, 10.1; 705/1.1, 705/28; 709/217, 218, 219; 29/403.3, 29/407.1; 700/95, 97, 111; 209/583, 584
See application file for complete search history.

(56) References Cited

U.S. PATENT DOCUMENTS

| | | | |
|---|---|---|---|
| 4,688,026 A | 8/1987 | Scribner et al. | |
| 5,014,206 A | 5/1991 | Scribner et al. | |
| 5,121,853 A | 6/1992 | Edelhoff et al. | |
| 5,326,939 A | 7/1994 | Schafer et al. | |
| 5,340,968 A | 8/1994 | Watanabe et al. | |
| 5,392,926 A | 2/1995 | Schafer et al. | |
| 5,416,706 A | 5/1995 | Hagenbuch | |
| 5,565,846 A | 10/1996 | Geiszler et al. | |
| 5,774,876 A | 6/1998 | Woolley et al. | |
| 5,804,810 A | 9/1998 | Woolley et al. | |
| 5,837,945 A | 11/1998 | Cornwell et al. | |
| 5,892,441 A | 4/1999 | Woolley et al. | |
| 5,947,256 A | 9/1999 | Patterson | |

(Continued)

FOREIGN PATENT DOCUMENTS

| | | |
|---|---|---|
| EP | 0905057 A1 | 3/1999 |
| EP | 07060985 B1 | 3/2000 |
| EP | 1477430 A1 | 11/2004 |

OTHER PUBLICATIONS

PCT/US07/005666 International Search Report mailed Dec. 19, 2007 (2 pages).

(Continued)

*Primary Examiner* — Van T. Trieu
(74) *Attorney, Agent, or Firm* — Goodwin Procter LLP

(57) ABSTRACT

Systems and methods for determining a relative quantity of recyclable items with respect to a total number of items are disclosed. In one embodiment of the present invention, a computer-implemented method includes reading an identifier respectively associated with at least some of a total number of items. The computer determines a number of identifiers associated with the recyclable items. The computer also receives the total number of items, and computes the relative quantity of recyclable items by dividing the number of identifiers associated with the recyclable items by the total number of items.

18 Claims, 5 Drawing Sheets

(56) References Cited

U.S. PATENT DOCUMENTS

| | | | |
|---|---|---|---|
| 5,959,568 A | 9/1999 | Woolley | |
| 6,191,691 B1 | 2/2001 | Serrault et al. | |
| 6,206,282 B1 | 3/2001 | Hayes, Sr. et al. | |
| 6,211,781 B1 | 4/2001 | McDonald | |
| 6,448,898 B1 | 9/2002 | Kasik | |
| 6,496,806 B1 | 12/2002 | Horwitz et al. | |
| 6,505,106 B1 | 1/2003 | Lawrence et al. | |
| 6,520,544 B1 | 2/2003 | Mitchell et al. | |
| 6,600,418 B2 | 7/2003 | Francis et al. | |
| 6,601,764 B1 | 8/2003 | Goodwin, III | |
| 6,687,683 B1 | 2/2004 | Harada et al. | |
| 6,690,402 B1 | 2/2004 | Waller et al. | |
| 6,694,248 B2 | 2/2004 | Smith et al. | |
| 6,759,959 B2 | 7/2004 | Wildman | |
| 6,847,892 B2* | 1/2005 | Zhou et al. | 701/408 |
| 6,867,683 B2 | 3/2005 | Calvesio | |
| 7,006,884 B2* | 2/2006 | Yamakado et al. | 700/97 |
| 7,080,435 B2* | 7/2006 | Yamakado et al. | 29/403.3 |
| 7,117,160 B1 | 10/2006 | Haynes et al. | |
| 7,142,118 B2* | 11/2006 | Hamilton et al. | 340/572.1 |
| 7,278,571 B2 | 10/2007 | Schmidtberg et al. | |
| 7,287,694 B2 | 10/2007 | Banavar et al. | |
| 7,313,602 B2* | 12/2007 | Ono et al. | 709/219 |
| 7,416,134 B2 | 8/2008 | McDonald et al. | |
| 7,449,656 B2* | 11/2008 | Madar et al. | 209/584 |
| 7,561,045 B2* | 7/2009 | Langlois et al. | 340/572.1 |
| 7,748,096 B2* | 7/2010 | Yamakado et al. | 29/403.3 |
| 2002/0105424 A1 | 8/2002 | Alicot et al. | |
| 2002/0154915 A1 | 10/2002 | Bullock et al. | |
| 2002/0170685 A1 | 11/2002 | Weik et al. | |
| 2002/0196150 A1 | 12/2002 | Wildman | |
| 2003/0067381 A1 | 4/2003 | Mitchell et al. | |
| 2003/0112155 A1 | 6/2003 | Landre et al. | |
| 2003/0132853 A1 | 7/2003 | Ebert | |
| 2003/0158795 A1 | 8/2003 | Markham et al. | |
| 2003/0227392 A1 | 12/2003 | Ebert et al. | |
| 2004/0004119 A1 | 1/2004 | Baldassari et al. | |
| 2004/0012481 A1 | 1/2004 | Brusseaux | |
| 2004/0021579 A1 | 2/2004 | Oursler et al. | |
| 2004/0027243 A1 | 2/2004 | Carrender | |
| 2004/0046672 A1 | 3/2004 | Kasik et al. | |
| 2004/0129781 A1 | 7/2004 | Kreiner et al. | |
| 2004/0133484 A1 | 7/2004 | Kreiner et al. | |
| 2004/0153379 A1 | 8/2004 | Joyce et al. | |
| 2004/0178264 A1 | 9/2004 | Linton et al. | |
| 2004/0199785 A1 | 10/2004 | Pederson | |
| 2005/0004702 A1 | 1/2005 | McDonald | |
| 2005/0055582 A1 | 3/2005 | Bazakos et al. | |
| 2005/0285743 A1 | 12/2005 | Weber | |
| 2006/0251498 A1 | 11/2006 | Buzzoni et al. | |
| 2007/0260466 A1* | 11/2007 | Casella et al. | 705/1 |
| 2008/0191009 A1 | 8/2008 | Gressel et al. | |

OTHER PUBLICATIONS

Fanelli, T. "Coastal Computer Corporation's ESC Software Extend Best Software's Peachtree Capabilities," WorldWire, Mar. 10, 2004 (2 pages).

WayBackMachine, SpiderWeave.com Terms of Service, Available at http://webarchive.org/web*//http://spiderweave.com/policies/terms-of-services.html. Accessed Sep. 15, 2008 (4 pages).

SwiftCD.com, "SwiftCD Late Payment Policy," Available at http://web.archive.org/web/2005031 0094935/http://www.swiftcd.com/faq.late.html. Accessed Mar. 21, 2009 (2 pages).

Murphy, P. "Tennessee Regulatory Authority Memorandum," Jul. 20, 2006 (3 pages).

Electronic Services Control website "Whats New," Available at http://web.archive.org/web/20040404035817/coastalcomputercorporation.com/html/overview. Accessed Sep. 14, 2008 (17 pages).

* cited by examiner

124

| | 402 | 404 |
|---|---|---|
| | ID | Number of Items |
| 418 | 1001 | 9800 |
| 420 | 1002 | 200 |
| 410 | 1003 | 90 |
| 416 | ⋮ | |
| 406 | 5922 | 5 |
| 412 | 9999 | 5 |

FIG. 4

| ID | Material Type | Banned Item | Special Handling Instructions | Company Brand | Weight (Ounces) |
|---|---|---|---|---|---|
| 1001 | Aluminum | No | None | ABC Inc. | 0.51 |
| 1002 | Paper | No | None | Not available | 2.1 |
| 1003 | Paper | No | None | XYZ Inc | 2.5 |
| 9999 | Iron | No | None | Not available | 1325 |
| : | | | | : | |
| 5922 | Solvent | Yes | Use protective gloves | Materials Corp. | 422 |

FIG. 5

SYSTEMS AND METHODS FOR INDICATING A QUALITY OF GROUPED ITEMS

RELATED APPLICATIONS

This application is a continuation of U.S. patent application Ser. No. 12/483,144, filed Jun. 11, 2009, entitled "Systems and Methods for Indicating a Quality of Grouped Items," now U.S. Pat. No. 8,068,029, which is a continuation of U.S. patent application Ser. No. 11/515,789, filed Sep. 6, 2006, entitled "Systems and Methods for Indicating a Quality of Grouped Items," now U.S. Pat. No. 7,561,045, the disclosures of each of which are incorporated by reference herein in their entirety.

This application is related to the following copending and commonly assigned patent applications, the disclosures of which are incorporated herein by reference in their entirety: U.S. Pat. No. 7,728,730 entitled "Systems and Methods for Measuring the Purity of Bales of Recyclable Materials," having application Ser. No. 11/515,806, filed on Sep. 6, 2006; U.S. Pat. No. 7,501,951 entitled "Systems and Methods for Identifying and Collecting Banned Waste," filed on Sep. 6, 2006; and U.S. Pat. No. 7,870,042 entitled "Systems and Methods for Identifying Banned Waste in a Municipal Solid Waste Environment," having application Ser. No. 11/433,505, filed on May 15, 2006.

BACKGROUND OF THE INVENTION

1. Field of the Invention

Embodiments of the present invention relate to systems and methods for indicating a quality of grouped items and, more particularly, to a quality of grouped items generated, for example, within a material recovery facility (MRF).

2. Background Description

Waste management companies provide residential, commercial and municipal waste management and recycling services for communities and organizations. Customers can include single residences, companies, or entire towns. Municipalities often contract with or otherwise engage a waste management service provider to handle both its municipal solid waste (MSW) and/or as its recycling services. MSW is garbage, refuse, and other discarded materials that result from residential, commercial, industrial, and/or community activities. MSW does not include banned waste, animal waste used as fertilizer, or sewage sludge.

Municipalities also encourage, or even require, recycling of selected materials including, but not limited to, paper, cans, plastic bottles, and glass. Generally, these materials are picked up either by a waste management company or a by municipality and taken to a material recovery facility (MRF), which is a facility that separates, processes, stores, and re-sells recoverable materials that have been collected.

At a MRF, materials are initially sorted by a variety of mechanical and manual means. The materials are further sorted and grouped by category and, within the category, sorted by quality. For example, clear glass is separated from colored glass, paper is separated from cardboard, and plastics are separated by type and color. Then glass is separated into various colors, where some colors are recycled more than other colors. When the final sorts are finished, some materials, such as plastic, steel, aluminum, paper, and cardboard are compressed into bales by large presses, and sold to customers who convert the baled material into consumer products.

Problems associated with the above described material sorting process are that it is material specific, inefficient to implement, and expensive. For example, the initial sort for identifying each item of waste is done by a person, which makes sorting inefficient and expensive. Another example is sorting plastics by using an optical device to determine various types of plastic. However, such optical devices are specific to the plastic, expensive to implement, useful only for a range of plastic recyclables and are limited to line-of-sight identification. Finally, eddy-current systems are useful only in connection with metal recyclables. With line-of-sight identification systems there are problems such as false identifications, and a process that is time and labor intensive. Thus, although these various processes and techniques are helpful for recycling, the end result is that errors in sorting occur, and sorted material is often commingled with un-separable, non-recyclable material and items.

Another problem with the material sorting processes is that municipalities continue to encourage and, in many cases, require recycling and reuse of recoverable materials, resulting in a growing amount of potentially recyclable material. This recyclable material becomes more commingled with non-recyclable materials as less care is taken to recycle properly by those required to recycle, leading to the aforementioned sorting issues of being material specific, inefficient to implement, and expensive. In the end, the quality of the sorted materials that are produced as commodities for sale declines, sometimes significantly. For example, many recoverable materials are converted into large bales before being sold, and these bales often become contaminated with non-recyclable material. The final recyclables to be sold may become so contaminated that a customer becomes unsatisfied with the quality (e.g., a low ratio of recyclables to non-recyclables and/or contaminated materials). The recycler may therefore need to accept a downgraded price (lower quality product) or returned product.

In view of the foregoing, we have discovered that there is a need to provide an accurate and verifiable measurement of the quality (e.g., percent purity) of a commodity within, for example, a bale of recovered material(s).

SUMMARY OF EMBODIMENTS OF THE INVENTION

Systems and methods for determining a relative quantity of recyclable items with respect to a total number of items are disclosed. In one embodiment of the present invention, a computer-implemented method includes reading an identifier respectively associated with at least some of a total number of items. The computer determines a number of identifiers associated with the recyclable items. The computer also receives a total number of items, and computes the relative quantity of recyclable items by dividing the number of identifiers associated with the recyclable items by the total number of items.

In another embodiment of the present invention, a computer-implemented method for determining a relative weight of recyclable items with respect to a weight of a total number of items is disclosed. In this embodiment, the method includes reading an identifier respectively associated with at least some of the total number of items, and determining the number of items detected by sensors and the number of recyclable items by detecting the number of identifiers associated with the recyclable items. The computer also determines a total weight of the recyclable items by multiplying the number of identifiers associated with the recyclable items by the weight of each recyclable item. In addition, the computer receives a weight from a scale measuring the total weight of the total number of items. Finally, the computer computes the relative weight by dividing the combined weight of all recyclable items by the weight of the total number of items. The computing of quality, both by number and by weight, can be performed at times so that the sorting process can be adjusted based on an interim computation.

In yet another embodiment of the present invention, a computer-implemented system for determining a quantity of recyclable items with respect to a total number of items is disclosed. The system includes a reader for reading an identifier respectively associated with at least some of the total number of items. A computer receives information associated with each identifier and determines a number of identifiers associated with recyclable items, and a total number of items. The computer also determines the relative quantity of recyclable items by dividing the number of identifiers associated with the recyclable items by the total number of items.

In a further embodiment of the present invention, a computer-implemented system is provided for determining a relative weight of recyclable items with respect to a total number of items. The system includes a reader for reading an identifier respectively associated with at least some of the items, and a scale for determining a weight of the total number of items. A computer computes the relative weight of recyclable items by determining a first weight by multiplying the number of identifiers associated with the recyclable items by the weight of each recyclable item, and dividing the first weight by the weight of the total number of items.

BRIEF DESCRIPTION OF THE DRAWINGS

The Detailed Description including the description of preferred systems and methods embodying features of the invention will be best understood when read in reference to the accompanying figures, wherein:

FIG. 4 is an exemplary table of a processed materials data repository in accordance with an embodiment of the present invention.

FIG. 5 an exemplary radio frequency identifier data repository in accordance with an embodiment of the present invention.

DESCRIPTION OF EMBODIMENTS OF THE INVENTION

Figure 1:
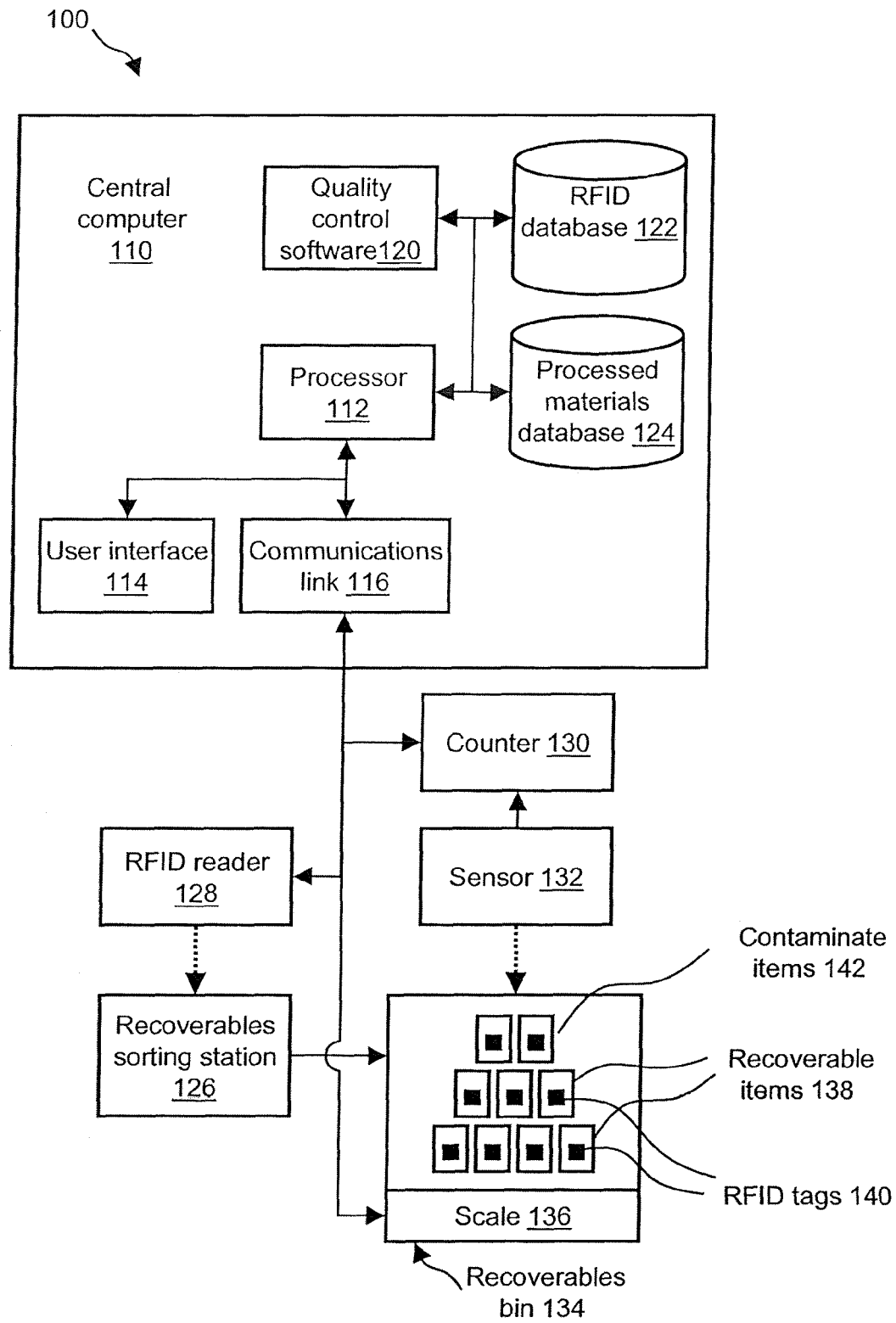
FIG. 1 is an exemplary block diagram of a quality control system in accordance with an embodiment of the present invention.

FIG. 1 is an exemplary block diagram of a quality control system 100 in accordance with an embodiment of the present invention. Quality control system 100 includes central computer 110, recoverables sorting station 126 for sorting recoverable items 138, and radio frequency identification (RFID) reader 128 for reading a plurality of RFID tags 140 attached to recoverable items 138 and contaminate items 142. Contaminate items 142 are those items in recoverables bin 134 which are mis-sorted, and which reduce the quality of the sorted items. As used herein, recoverable items 138 are items that are made of a particular material of interest, such as aluminum or plastic. Contaminate items 142 are items that are items that are not made of a particular material of interest. For example, recoverable items 138 of aluminum may be desired. In this case, plastic items and paper items would be contaminate items 142, since it is only items of aluminum that are of interest. Recoverable items 138 may also be called recyclable items, since there would no desire to recover an item if it could not be recycled.

System 100 also includes sensor 132 for sensing the number of recoverable items 138 and contaminate items 142, counter 130 for converting the number of items 138, 142, recoverables bin 134 for storing recoverable items 138 and contaminate items 142, and scale 136 for weighing the recoverable items 138 and contaminate items 142.

Central computer 110 is a standard computer system that includes industry-standard components, such as a processor 112, user interface 114, and communications link 116. Central computer 110 further includes quality control software 120 and one or more databases. This can include RFID database 122 that contains information corresponding to data contained within a RFID tag, as will be discussed in connection with FIG. 5. This can also include a processed materials database 124 for storing a record of all material deposited in recoverables bin 134, as will be discussed in connection with FIG. 4.

Processor 112 can be a standard microprocessor, such as a Pentium or a PowerPC® microprocessor device. User interface 114 can be a standard computer user interface for inputting and displaying data, such as a keyboard and mouse, a touch screen for inputting data, and a computer display with the accompanying menus and prompt regions. Communications link 116 can be a standard wired or wireless communications link that facilitates the exchange of data between processor 112 and quality control software 120 and the data collection devices of the system that include, for example, RFID reader 128, counter 130, sensor 132, and scale 136.

Quality control software 120 analyzes RFID data received from RFID tags 140 of recoverable items 138 and contaminate items 142 via RFID reader 128, data received from counter 130, and scale data received from scale 136. This analysis can be performed in conjunction with RFID database 122. RFID database 122 may contain a record of RFID data that is associated with recoverable 138 and/or and contaminate items 142, which may include banned and/or special waste items. For example, RFID database 122 can contain a record of specific RFID data associated with glass containers, plastic containers, aluminum containers, and/or paper products, as well as any banned material and/or special waste items. The data can be a unique identifier associated, for example, with each type or class of material. Quality control software 120 can cross reference the data stored in RFID database 122 with RFID data received from RFID reader 128 to determine, for example, the material type of each waste item. An exemplary RFID database 122 is described in connection with FIG. 5.

Processed materials database 124 contains a record of materials and quantities thereof deposited in recoverables bin 134. Quality control software 120 may utilize processed materials database 124 to determine a measure of sort quality. The information stored within processed materials database 124 can include or utilize a cross-reference, for example, to a collection of materials with information pertaining to company brand information, material type, whether the item is a banned or hazardous item, handling instructions and/or item weight. Databases 122 and 124 reside in a memory device, such as a hard disk drive (not shown), and may be implemented using a standard database.

Recoverables sorting station 126 collects materials that are targeted for recycling. The sorting mechanisms within each recoverables sorting station 126 can be diverters such as air jets, switching devices, magnets, eddy currents, and/or mechanical arms. Recoverables bin 134 is any type of container, within which a specific type of recoverable is collected temporarily.

Each RFID tag 140 is a standard wireless device for identifying items, such as recoverable items 138 and contaminate items 142. A RFID tag is formed of a microchip that is attached to an antenna. Data used in connection with RFID database 122 can be stored on the microchip in a standard manner.

RFID reader 128 can be a commercially available RFID tag reader system, such as the TI RFID system, manufactured by Texas Instruments (Dallas, Tex.). RFID reader 128 scans RFID tags 140, extracts the data contained within the tags 140, and transmits the data to central computer 110.

Sensor 132 is a commercially available position or proximity sensor device that detects the presence of an object, without physical contact. For example, sensor 132 is an inductive, capacitive, or ultrasonic proximity sensor, such as that supplied by Omron Electronics LLC (Schaumburg, Ill.).

Counter 130 can be a standard counter device that can maintain a count in response to an input signal. Counter 130 may be a commercially available standalone device or, alternatively, a standard binary counter logic function that is integrated into central computer 110. The combination of sensor 132 and counter 130 is used to count the total number of objects (recoverable items 138 and contaminate items 142) that are deposited into recoverables bin 134. Scale 136 is a general industrial weighing scale, such as the Siltec WS2000L, distributed by Precision Weighing Balances (Bradford, Mass.), that is used to weigh recoverables bin 134 including its contents.

When system 100 is operating, recoverable items 138 and contaminate items 142 are sorted, recorded, counted, deposited into recoverables bin 134, and weighed by scale 136. After the recording and counting processes, the collected data can be transmitted to central computer 110.

At the beginning of the sorting process, counter 130 is reset to a value of zero, and at least a portion of processed materials database 124 is made available for use with the current sorting process. Additionally, scale 136 can be calibrated, either by recording an empty weight of recoverables bin 136 or by adjusting scale to read "empty" with the weight of recoverables bin 136. Once the sorting process begins, presorted recoverable items 138 are transferred along a conveyance mechanism (not shown) to recoverables sorting station 126. For example, if recoverables sorting station 126 is a sorting station that is dedicated to sorting aluminum containers, recoverable items 138 that feed recoverables sorting station 126 have been presorted to include a high percentage of aluminum containers. However, the presort process is not perfect and, thus, a relatively small percentage of contaminants or other material types (e.g., plastic or glass containers) are present in this presorted stream. To improve the quality of the sort, a second sorting operation can be performed at recoverables sorting station 126.

After recoverable items 138 and contaminate items 142 depart recoverables sorting station 126, each respective RFID tag 140 is scanned by RFID reader 128. The data stored on RFID tags 140 is transmitted to central computer 110 via communications link 116. Subsequently, RFID data of each recoverable item 138 and contaminate items 142 is stored in processed materials database 124, as will be discussed in connection with FIG. 4.

Next, recoverable items 138 and contaminate items 142 are transported downstream and deposited into recoverables bin 134. During this stage, sensor 132 detects each recoverable item 138 and contaminate item 142 passing within its field of view. Sensor 132 communicates with counter 130 to count each recoverable item 138 and contaminate item 142 passing by.

At the completion of the sorting process, such as when recoverables bin 134 is full, the value of counter 130, which represents the total number of recoverable items 138 and contaminate items 142 in recoverables bin 134, is transmitted to central computer 110 via communications link 116 and stored, for example, in processed materials database 124. Additionally, the weight of the items (e.g., recoverable items 138 and contaminate items 142) in recoverables bin 134 is transmitted from scale 136 to central computer 110 for storage, for example, in processed materials database 124.

Finally, quality control software 120 operates on the data stored in processed materials database 124. Quality control software 120 calculates the percent quality of the final sorted materials within recoverables bin 134 using RFID database 122.

To detect banned waste, data read from the identifiers, which is stored in processed materials database, can be compared to reference data stored within another data repository 124. For example, if an ID of 5922 was read as shown in row 406 of processed materials database 124 in FIG. 4, this value could be searched for in RFID database 122, an exemplary embodiment of which is shown in FIG. 5. The cross-referencing of a common ID 402 (e.g., 5922 in row 406) indicates, in this instance, that banned waste has been found, as indicated by column 506 in FIG. 5, and an alert should be sounded.

Quality control software 120 may be used to analyze the identifiers 402 stored in processed materials database 124. For example, software 120 may cross-reference the identifier 402 data of processed materials database 124 to that of RFID database 122, as shown in FIG. 5. In this instance, a common identifier in column 402 of processed materials database 124 and RFID database 122 identifies a common item or material (as per the example above).

In addition, the identifier 402 data of processed materials database 124 may also be cross-referenced to a Resource Conservation and Recovery Act/Department of Transportation (RCRA/DOT) database (not shown), available from the U.S. Environmental Protection Agency (EPA). Quality control software 120 may also query another third party remote banned material database for banned materials information if there is insufficient information in the RCRA/DOT database to identify the material. In doing so, quality control software 120 may determine the type items associated with the item identifier 402 in processed materials database 124 to determine if any of the items may, for example, be banned waste.

If any banned waste items are identified, operations personnel of MRF quality control system 100 are notified, and appropriate action is taken to handle the banned waste. For example, with regard to FIG. 5, this information may be stored in column 506. For the example ID of 5922 (row 406) above, personnel would be warned to use protective gloves. Notification can be made by an audio or visual alert. Audio/visual alert mechanism can be a buzzer, beeper, tone, flashing light emitting diode (LED), that notifies operations personnel that a banned waste item has been detected. Audio/visual alert mechanism can also be implemented on a computer using its visual display and/or its audio capabilities.

Figure 2:
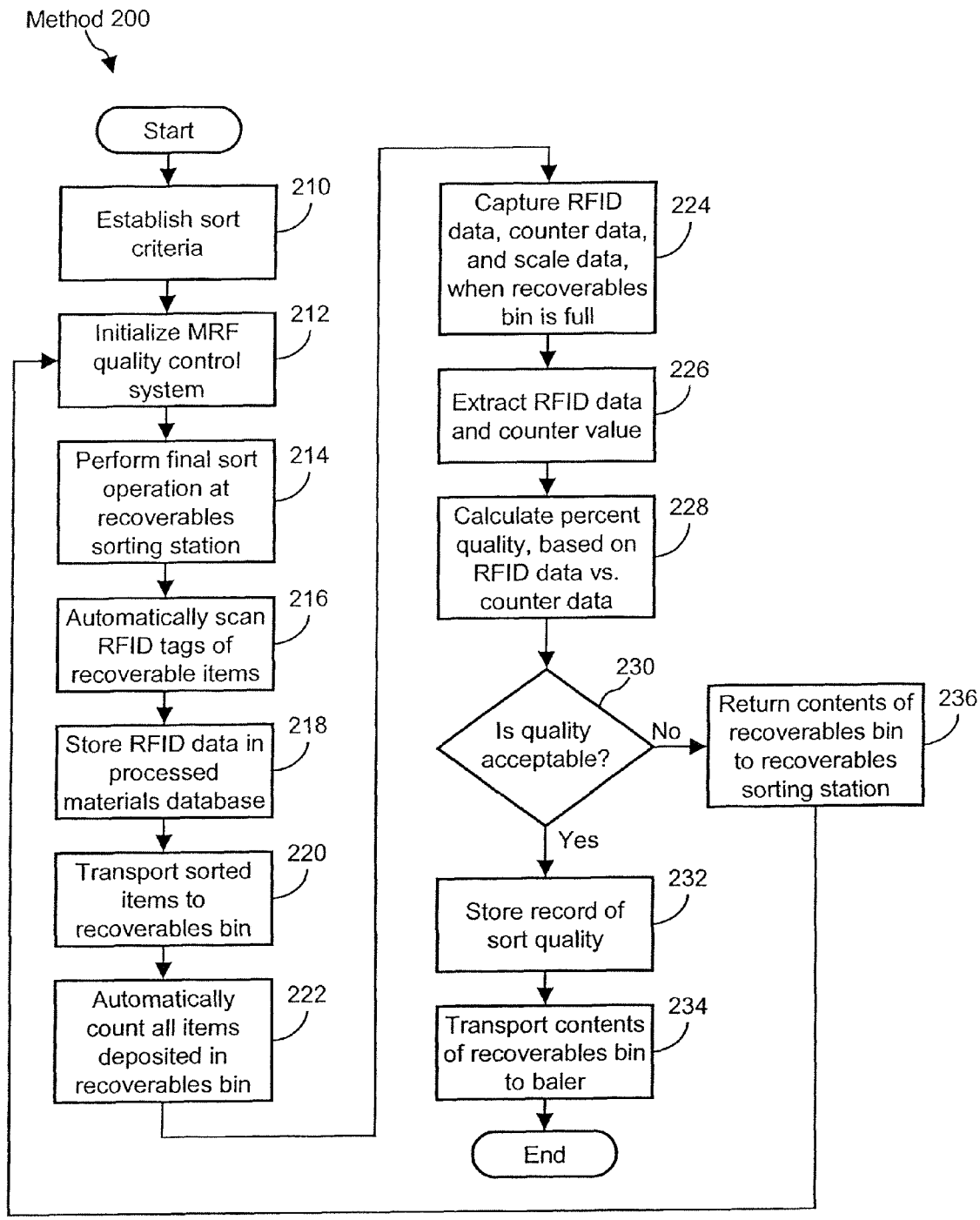
FIG. 2 is an exemplary flow diagram for determining a relative quality of sorted recoverable items in accordance with an embodiment of the present invention.

FIG. 2 is a flow diagram for determining a relative quality of sorted recoverable items 138. At step 210, the sort criterion of recoverables sorting station 126 is established. The sort criterion is the type of material that the sorting process is supposed to obtain. Additionally, a quality criterion is set, which represents the minimum percentage, by item count or weight, of recoverable items 138 meeting the sort criterion, that is to be included in recoverables bin 134. Quality criterion may be utilized to account for different purchasers having different requirements for the maximum allowable amount of contamination. Both the sort and quality criterion are possible because each recoverables sorting station 126 can collect a specific material type, such as aluminum containers.

At step 212, as an initialization task, when recoverables bin 136 is empty, counter 130 is reset to zero, an initial weight from scale 136 is captured, and a portion of processed materials database 124 is made available. At step 214, a final sort operation is performed at recoverables sorting station 126. More specifically, presorted recoverable items 138 are transferred along a conveyance mechanism (not shown) to recoverables sorting station 126. For example, if recoverables sorting station 126 is dedicated to sorting aluminum containers, the recoverable items 138 that feed recoverables sorting station 126 have, in one or more embodiments, been presorted to include a relatively high percentage of aluminum containers. However, the presort process is imperfect and, thus, some (lesser) percentage of contaminants or other material types (e.g., plastic or glass containers), with or without RFID tags 140, are present in this presorted stream.

At step 216, each respective RFID tag 140 is scanned by RFID reader 128 as it leaves recoverable sorting station 126. RFID reader 128 transmits the RFID data, as it is collected during scanning, to central computer 110 via communications link 116. Alternatively, RFID data can be stored by RFID reader 128 or another appropriate device for sending all RFID data at once, after scanning has been completed.

At step 218, RFID data (or a portion thereof) read from tag 140 of each recoverable item 138 is received by central computer 110 and stored in processed materials database 124. Processed materials database 124 contains a record of items 138, 142 whose tags 140 have been read, or can be used to ascertain all items 138, 142 whose tags 140 have been read, and the quantities of each respective item 138, 142, that were deposited in recoverables bin 134. Accordingly, processed materials database 124 will be updated as items 138, 142 are being scanned by RFID reader 128, and deposited in recoverables bin 134.

In one embodiment, processed materials database 124 utilizes or accesses RFID database 122. RFID database 122 contains a record of RFID data that is associated with all recoverable 138 and/or contaminate 142 items, which may include hazardous and/or special waste items. In operation, RFID database 122 is cross-referenced (or queried) by quality control software 120 when it receives RFID data from RFID reader 128.

More particularly, RFID database 122 may contains a record of the specific RFID data associated with various glass containers, plastic containers, aluminum containers, and/or paper products, as well as any banned material, such as a hazardous and/or special waste items. As shown in FIG. 5, one embodiment of RFID database 122 includes, for example, ID 402, material type 502, banned item status 504, special handling instructions 506, company brand 508, and weight 510 information. Additional information such as, for example, disposal cost per item may also be stored or accessed by RFID database 122.

In operation, and RFID reader 128 scans the tag 140 of each item 138, 142, and quality control software 120 accesses RFID database 122 to determine the item 138, 142 being scanned. For example, if an ID 402 of 1001 is scanned (row 418, FIG. 5), quality control software 120 may populate processed material database 124 each time that an item 138, 142 having an ID of 1001 is scanned. As shown in FIG. 4, row 418 indicates that, at a given point in time for a given recoverables bin 134, 9800 items having ID of 1001 have been scanned and are in recoverables bin 134. Of course, as additional items 138, 142 having the same or other IDs are scanned by RFID reader 128, processed materials database 124 will be updated accordingly.

At step 220, recoverable items 138 that pass through recoverables sorting station 126 are transported downstream and deposited into recoverables bin 134. At step 222, sensor 132 detects each item passing within its field of view. This includes the detection of both recoverable 138 and contaminate items 142. Counter 130 is in communication with sensor 132 and is incremented each time sensor 132 detects a new item.

At step 224, when recoverables bin 134 is full, the value of counter 130 represents the total combined number of recoverable items 138 and contaminate items 142 in recoverables bin 134. This value is transmitted to central computer 110, and can be stored, for example, in processed materials database 124. Additionally, scale data from scale 136, which indicates the weight of recoverable items 138 and contaminate items 142 in recoverables bin 134 when full, may be transmitted to central computer 110 and stored, for example, in processed materials database 124. Furthermore, processed materials database 124 can store additional RFID data, such as shown in FIG. 5, associated with each full recoverables bin 134.

At step 226, quality control software 120 uses processed materials database 124 to determine a total number of recoverable items 138 within recoverables bin 134 that meet the sort criterion, and the total number of contaminate items 142 that do not. For example, software 120 may access each row (e.g., 418, 420, 410, 412, and 406) of processed materials database 124, and utilize the ID 402 of each row to determine the number of items 404 for each row, and thus the total number of items by summing the number of items 404 associated with each row. Quality control software 120 may also determine which IDs 402 are items of interest. For example, it may be determined that only items having an ID 402 of 1001 (row 418) are of interest, and are thus the recoverable items 138. In this case, the total number of contaminate items 142 can be determined by counting the total number items 404 associated with each row other than row 418. RFID database 122 can be cross-referenced by using ID 402 field within each database 124, 122 to obtain additional information as may be desired.

At step 228, quality control software 120 performs a calculation to determine the percentage of recoverables items 138 that meet the expected sort criterion. This is done by comparing the number of recoverable items 138 within recoverables bin 134 to the total number of all items 138, 142 within recoverables bin 134.

For example, based on the analysis of step 226, quality control software 120 determines that RFID data of 9,800 recoverable items 138 is captured (e.g., they are aluminum containers), from row 418 of processed materials database 124 (FIG. 4). Based on the counter data that is captured in step 224, quality control software 120 determines that a total of 10,100 items 138, 142 are present within recoverables bin 134, by adding the number of items 404 of rows 418, 420, 410, 406, 412 of FIG. 4. Accordingly, the percent quality of the sort operation of recoverables sorting station 126 is calculated as follows:

# of items that meet the sort criterion÷total number of items in bin p e.g., 9,800÷10,100=0.97 or 97% expected material, and 3% contaminants.

At decision step 230, if the percent quality, as calculated in step 228, is equal to or exceeds the quality criterion set in step 210, then, at step 232, a record of the percent quality, as calculated in step 228, can be stored, for example, in processed materials database 124. It should be understood that if all or substantially all it the items 138, 142 in recyclables bin 134 have tags 140 thereon, a percent purity by weight calculation may be performed by quality control software. In this case, the number of items associated with rows 418, 420, 410, 406, 412 in FIG. 4 are cross referenced by using ID column 402 in FIGS. 4 and 5 to determine the weight of each item, as provided by column 510 in FIG. 5. Well known and understood mathematical calculations can then be performed to obtain the total weight of items in rows 418, 420, 410, 406, 412 of FIG. 4, and thus the total weight of items in bin recoverables 134.

At step 234, the contents of recoverables bin 134 is transferred downstream for further processing. For example, the contents of recoverables bin 134 can be transferred to a baler, so that items 138, 142 can be compacted and baled, for shipment to a customer. One or more RFID tags can be placed on the bale, indicating the relative quantity of desired goods (e.g., aluminum cans) within the bale. The RFID tag data can also be stored in processed materials database 124.

If at decision step 230 it is determined that the quality is below the quality criterion set in step 210, then, at step 236, the contents of recoverables bin 134 can be reprocessed to improve the quality. The goal of reprocessing is to improve the quality of recoverable items 138 by removing contaminate items 142.

One method for improving quality and removing contaminate items is to return the content of recoverables bin 134, in isolation, to the feed stream of recoverables sorting station 126 or some other sort operation (not shown), in order to improve the percent quality of the sort. Another method for removing contaminate items from recoverables bin 134 is to manually process the items 138, 142 in recoverables bin 134. Depending on the measured quality and the proximity of the measured quality to a desired threshold, a sufficient number of contaminate items could be removed by hand to meet a minimum quality threshold. Alternatively, the contents of the recoverables bin 134 could be sent back through the sorting process along with other recoverables. This may be used to average out any pocket of contaminate items 142 in all the items 138, 142 being processed.

Figure 3:
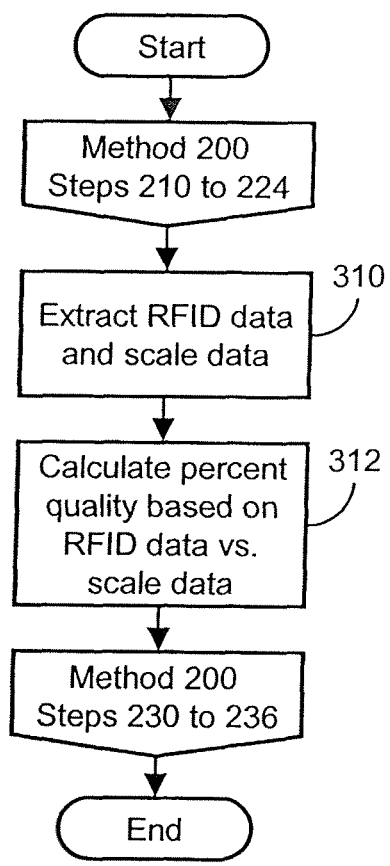
FIG. 3 is an exemplary flow diagram for determining a quality of desired items in accordance with an embodiment of the present invention.

FIG. 3 is a flow diagram for determining the quality of sorted recoverable items 138 in accordance with another embodiment of the present invention. In contrast to the embodiment of FIG. 2, the embodiment of FIG. 3 is based on the weight of recoverable items 138 versus the combined weight of items 138, 142. The steps of method 300 are the same as or similar to those of method 200 of FIG. 2, except for the replacement of steps 226 and 228 of method 200 with steps 310 and 312, respectively, of method 300. Method steps 310 and 312 are described as follows.

At step 310, quality control software 120 may utilize RFID database 122 to determine the number of recoverable items 138, such as aluminum containers, within recoverables bin 134 that meet the expected sort criterion of step 210, in a manner as described in connection with step 218. Furthermore, the data of scale 136, which represents the actual weight of all items 138, 142 in recoverables bin 134 when full, is obtained. The weight may be stored, for example, by computer 110 for any length of time as may be needed. For example, the weight may be stored in processed materials database 124.

At step 312, quality control software 120 determines the percent quality of the sort operation by comparing the expected combined weight of all recoverable items 138 within recoverables bin 134 that meet the expected sort criterion, to the actual weight of all items 138, 142 in recoverables bin 134 when full. For example, based on the analysis of step 226, using FIG. 4, row 418, quality control software 120 determines that RFID data of 9,800 recoverable items 138 having an ID of 1001 was captured that meet the sort criterion of step 210 (e.g., they are aluminum containers). Using RFID database 122, quality control software 120 can calculate the expected weight of the 9,800 items which met the sort criterion. For example, quality control software 120 accesses row 418, and determines that the weight of item 1001 is 0.51 ounces, using row 418 and column 510 of FIG. 5. Therefore, quality control software 120 calculates the combined weight of 9,800 recoverable items 138 to be approximately 4,998 ounces (9800 items×0.51 ounces per item). Then, using the weight of the full recoverables bin 134 measured by scale 136, quality control software can determine the percent quality of the sort operation as follows:

Combined weight of items that meet the sort criterion÷actual weight of the contents of the bin (assume the scale measured 5,500 ounces) yields 4,998/5,500=0.909, or 90.9% quality of recoverable items 138, and therefore 10.1% contaminant items 142.

The process for computing the quality of the sorted items both by quantity and by weight can be performed before recoverables bin 134 is full. For example, a quality of the sorting process could be computed periodically, continuously, or at other times, during the sorting process. The interim determinations of quality may be used like feedback to improve the quality of the sorting process by adjusting how it is done. For example, if the sort quality was at 85%, but 90% was desired, items 138, 142 could be sorted more slowly by reducing a conveyor belt speed. Alternatively, instead of slowing the sorting process down, more resources could be applied to the sorting process, for example, by adding additional personnel to detect and remove items not meeting the sort criterion.

FIG. 4 is an exemplary database table of processed materials database 124 in accordance with an embodiment of the present invention. ID column 402 stores an identifier associated with each item 138, 142, that is obtained by scanning RFID tags 140. Column 404 represents the number of each item having a particular ID. For example, as shown in row 418, there are 9800 items that have been scanned by reader 128 having an ID of 1001.

FIG. 5 is an exemplary database table of RFID database 122 in accordance with an embodiment of the present invention. Column 402 stores the ID value, and is used to match the information scanned by reader 128 from RFID tag 140. Exemplary information provided by RFID tag 140 is shown in columns 502, 504, 506, 508, and 510. Column 502 provides the type of material that corresponds to the scanned information. Columns 504 and 506 respectively indicate if an item is a banned waste item, or whether the item requires special handling. In either case, central computer 110 can trigger, for example, a visual and/or audible alarm indicating that such circumstance(s) exist. Central computer 110 may also provide written instructions corresponding to column 506. Such instructions may either be visually provided on a monitor associated with central computer 110, or printed by a printer associated with central computer 110. Column 508 indicates that company that manufactures the item 138, 142 or brand of the item 138, 142. Column 510 indicates the weight of the item 138, 142.

Returning now to FIG. 4, it should be understood that FIG. 4 may also include additional information. For example, if desired, FIG. 4 may also include for each ID 402 one or more of type of material 502, banned item 504 status, special handling instructions 506 and/or company brand 508. In addition, processed materials database 124 may also include, for example, the computed percent quality as calculated in step 228 (FIG. 2) and/or step 312 (FIG. 3) as discussed herein.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention. While the foregoing invention has been described in detail by way of illustration and example of preferred embodiments, numerous modifications, substitutions, and alterations are possible without departing from the scope of the invention defined in the following claims.

We claim:

1. A computer-implemented method for determining a relative quantity of recyclable items in a total number of items:
   receiving by the computer a number of identifiers associated with the recyclable items;
   receiving at the computer the total number of items;
   computing the relative quantity of recyclable items by dividing the number of identifiers associated with the recyclable items by the total number of items; and
   receiving a specification of items of interest to define the recyclable items in the total number of items.

2. The computer-implemented of claim 1, further comprising communicating instructions for removing at least a portion of the total number of items when the relative quantity is less than a predetermined threshold.

3. The computer-implemented method of claim 1, wherein the identifiers comprise radio frequency identifier tags.

4. The computer-implemented method of claim 3, further comprising communicating instructions for removing at least a portion of the total number of items when the relative quantity is less than a predetermined threshold.

5. The computer-implemented method of claim 3, further comprising:
   accessing a data repository to calculate an expected weight of the recyclable items as a function of the number of identifiers associated with the recyclable items;
   receiving a weight of the total number of items; and
   computing the relative weight of the recyclable items by dividing the expected weight of the recyclable items by the weight of the total number of items.

6. The computer-implemented method of claim 1, further comprising accessing a data repository by the computer to determine the number of identifiers associated with the recyclable items.

7. The computer-implemented method of claim 6, further comprising generating an alert if an identifier is associated with a banned waste item.

8. The computer-implemented method of claim 1, further comprising generating an alert if an identifier is associated with a banned waste item.

9. The computer-implemented method of claim 1, further comprising adjusting a sorting process of the total number of items as a function of the relative quantity of recyclable items.

10. The computer-implemented method of claim 1, further comprising:
    accessing a data repository to calculate an expected weight of the recyclable items as a function of the number of identifiers associated with the recyclable items;
    receiving a weight of the total number of items; and
    computing the relative weight of the recyclable items by dividing the expected weight of the recyclable items by the weight of the total number of items.

11. The computer-implemented method of claim 1, further comprising communicating instructions for returning the total number of items to a sorting station in isolation from all other items when the relative quantity is less than a predetermined threshold.

12. A system for determining a relative quantity of recyclable items in a total number of items, comprising
    a computer configured for:
      determining a number of identifiers associated with the recyclable items;
      determining the total number of items;
      computing the relative quantity of recyclable items by dividing the number of identifiers associated with the recyclable items by the total number of items; and
    receiving a specification of items of interest to define the recyclable items in the total number of items.

13. The system of claim 12, further comprising a data repository accessible by the computer for determining the number of identifiers associated with the recyclable items.

14. The system of claim 12, further comprising a reader for reading an identifier respectively associated with at least some of the total number of items.

15. The system of claim 14, wherein the identifiers comprise radio frequency identifier (RFID) tags, and wherein the reader is an RFID reader.

16. The system of claim 12, further comprising one or more sorting stations for separating the total number of items from a respective input stream.

17. The system of claim 16, wherein the respective input stream for at least one of the sorting stations comprises a returned portion of the total number of items when the computer determines that the relative quantity is less than a predetermined threshold.

18. The system of claim 12, further comprising:
    a sensor for sensing each item of the total number of items;
    a counter in communication with the sensor and accessible by the computer for counting each sensed item to define the total number of items; and
    a scale for weighing the total number of items.

* * * * *